March 15, 1960 E. A. GILBERT ET AL 2,929,052
TELEMETERING APPARATUS
Filed Jan. 7, 1958
2 Sheets-Sheet 1

EVERETT A. GILBERT
and GEORGE L. KING
INVENTORS

BY
Rudolph J. Quick
ATTORNEY

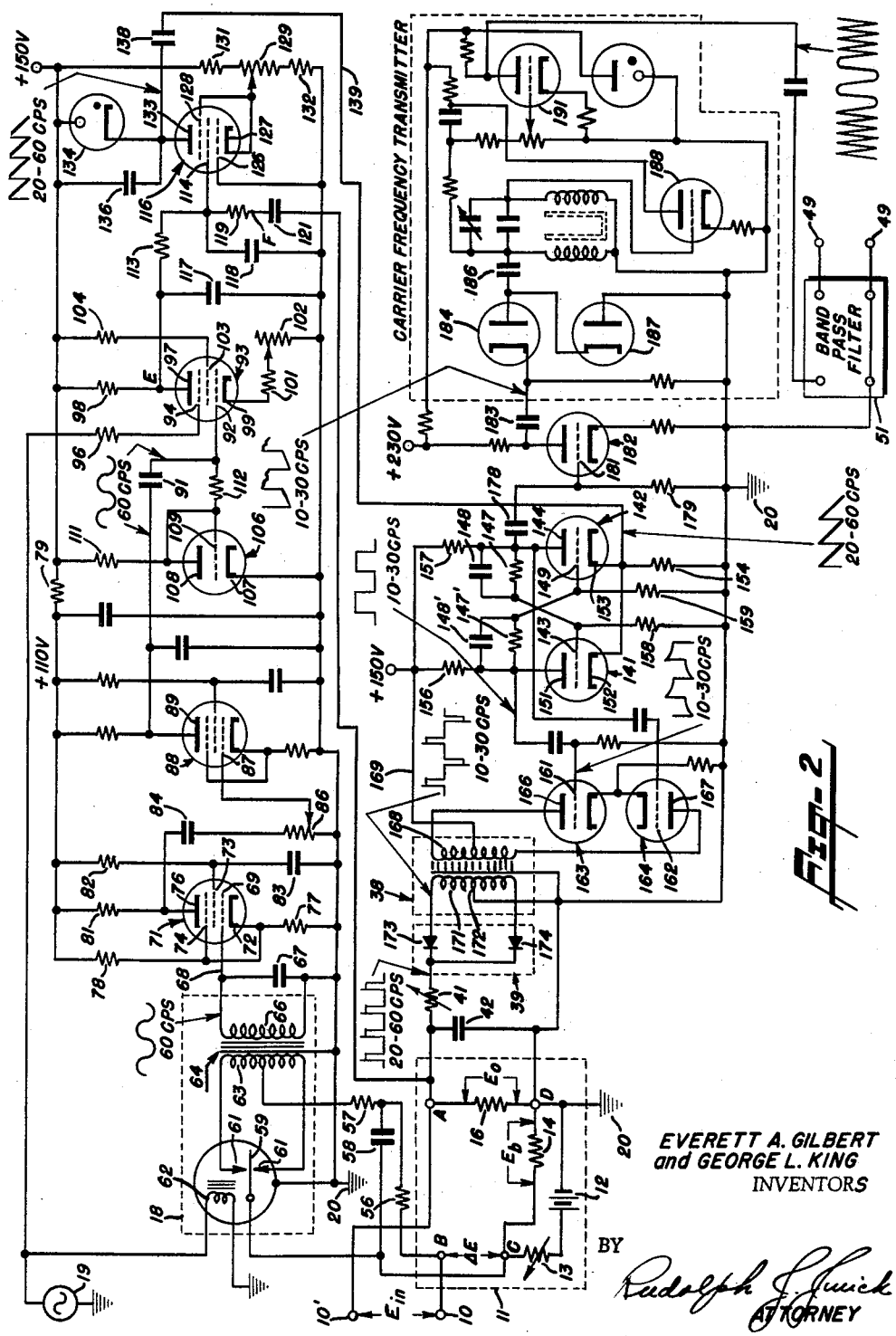

United States Patent Office 2,929,052
Patented Mar. 15, 1960

2,929,052

TELEMETERING APPARATUS

Everett A. Gilbert, Denville, and George L. King, Morris Plains, N.J., assignors to Radio Frequency Laboratories, Inc., Boonton, N.J., a corporation of New Jersey Application January 7, 1958, Serial No. 707,499

7 Claims. (Cl. 340—186)

This invention relates to telemetering apparatus and more particularly to a transmitter for use in telemetering systems.

The telemeter transmitter of our invention is of the frequency modulation type, wherein a direct current millivolt input is accurately converted to an output voltage variable in frequency between 10 to 30 cycles per second; the frequency of the output voltage being directly related to the direct current input voltage. This 10–30 c.p.s. output voltage may be used to modulate a frequency shift carrier wave. The carrier voltage is adapted to be applied, through a wire line, radio or microwave link, to a suitable receiver. At the receiver the FM carrier signal is reconverted into a direct current voltage output for actuation of a panel meter, recorder, or the like.

The transmitter of our invention may be used in telemetering systems for telemetering such quantities as temperature, speed, pressure, position, power, humidity, and the like. Any quantity which may be measured in terms of a direct current voltage, or converted into a direct current voltage or current by a suitable transducer, may be telemetered.

In our transmitter, novel circuitry is employed in converting the direct current, or analog input, voltage to a variable frequency voltage directly related to the magnitude of the input voltage, which circuitry includes a degenerative feedback loop, or network. By use of our novel feedback circuit, an extremely accurate conversion from the direct current input to the variable frequency output is obtained. Stabilization of the above feedback loop is provided by means of a novel derivative feedback circuitry.

An object of this invention is the provision of a novel telemetering transmitter for accurately converting an analog input signal into an alternating current signal having a frequency which is directly related to the magnitude of the analog input signal.

An object of this invention is the provision of an apparatus for converting an analog input signal into an alternating current output signal having a frequency which is directly related to the magnitude of the analog input signal, the said apparatus including a novel discriminator-oscillator circuitry therein.

An object of this invention is the provision of an apparatus for converting an analog input signal into an alternating current output voltage, the frequency of which varies directly with the magnitude of the analog input, the said apparatus comprising a converter having an input and output circuit, the said analog input signal being connected to the said converter input circuit, discriminator means connected to the said converter output circuit and converting the output therefrom to a direct current control voltage proportional to the amplitude of the converter output, oscillator means converting the direct current control voltage from the discriminator to an alternating current output voltage having a frequency which varies directly with the magnitude of the control voltage, saturable reactor means converting the alternating current output voltage from the oscillator means to a direct current voltage which is proportional to the frequency of oscillation thereof, and a differentiating circuit responsive to the direct current output from the said discriminator means, the said converter being responsive to the algebraic sum of the said analog input signal, differentiating circuit output and direct current output from the said saturable reactor means.

These and other objects and advantages will become apparent from the following description when taken with the accompanying drawings, the drawings are for purposes of illustration and are not to be construed as defining the scope or limits of the invention, reference being had for the latter purposes to the appended claims.

In the drawings wherein like reference characters denote like parts in the several views:

Figure 2 is a schematic circuit diagram thereof.

Figure 1:
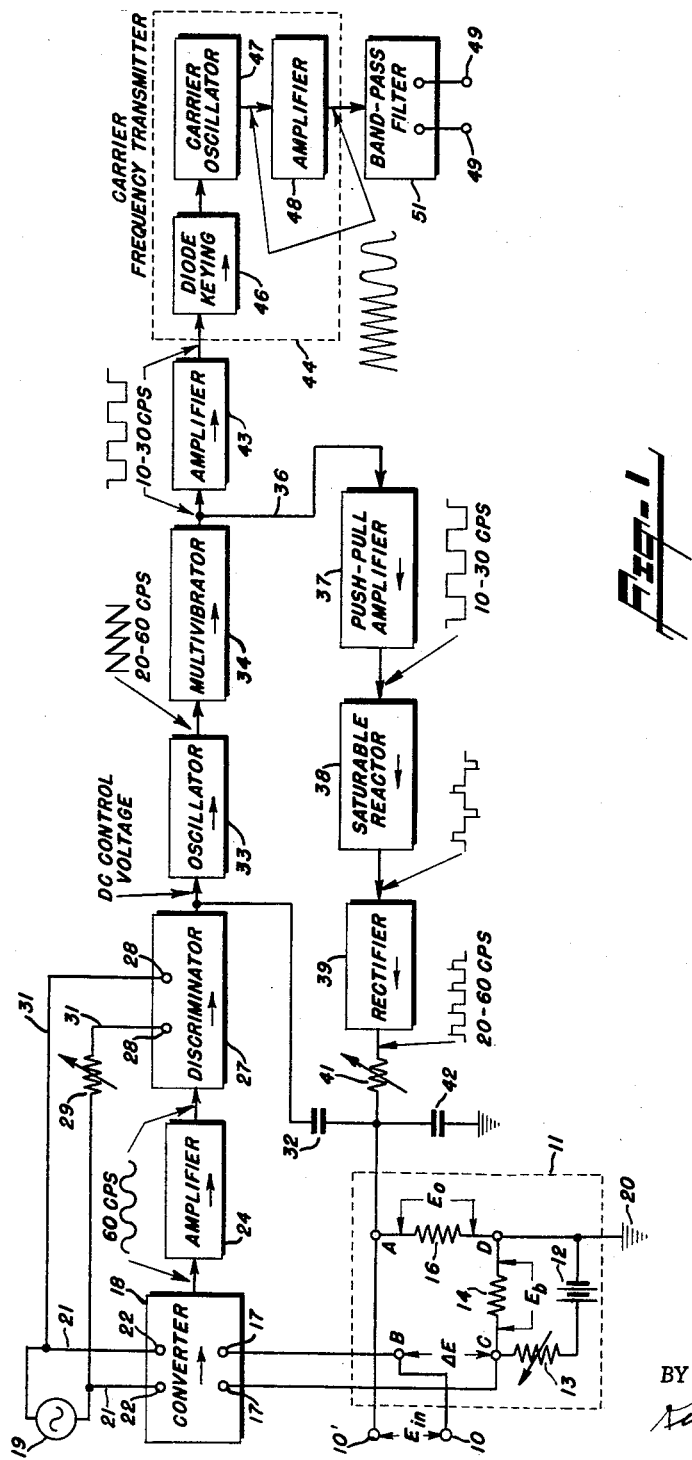
Figure 1 is a block diagram representation of our novel telemeter transmitter.

Reference is now made to Figure 1 of the drawings wherein the direct current millivolt quantity, or analog input, to be transmitted, and which is designated $E_{in}$, is shown connected to a pair of input terminals 10, 10'. The input terminals 10, 10' are connected to points B and A, respectively, of an input bridge circuit, designated 11; the analog input source comprising one leg of the bridge network. The bridge circuit includes in another leg thereof between points C and D, a source of potential 12 connected in series with a variable resistor 13. The series connected potential source and variable resistor provide an adjustable base voltage designated $E_b$, across a resistor 14; the voltage $E_b$ being hereinafter designated the base voltage. Another leg of the bridge 11 between points A and D includes a resistor 16 across which a feedback voltage, designated $E_o$, is developed. The remaining leg of the bridge network, between points B and C thereof, is connected to the input terminals 17 of a converter 18; the input potential to the converter being designated $\Delta E$. Point D in the bridge network is connected to a common ground 20.

The converter 18, which may be of any suitable type, is preferably of the vibrator type and includes a movable contact activated in opposite directions to alternately make and break electrical contact with a pair of spaced fixed contacts. Vibration of the movable contact is obtained by use of a source of alternating potential 19 which is connected through lead wires 21 to terminals 22 of the vibrator; the alternating potential 19 being any suitable 60 cycle source preferably. The input to the vibrator is converted to a pulsating potential at the vibrator output circuit; the magnitude of the output varying directly with the magnitude of $\Delta E$, and the phase thereof reversing with changes of polarity of $\Delta E$.

The vibrator output is connected through an amplifier 24 to the input of a discriminator 27. Terminals 28 of the discriminator are connected to the 60 cycle alternating potential source 19 through a variable resistor 29 and lead wires 31. The discriminator output is a direct current voltage, designated the D.-C. control voltage, which varies with the magnitude of the 60 cycle per second input thereto from the amplifier 24. When the amplifier output voltage and the potential source 19 are in phase, the D.-C. control voltage is minimum, and when the two voltages are out of phase the control voltage is maximum, with minimum and maximum values, respectively, of amplifier output.

The D.-C. control voltage from the discriminator 27 is connected through a capacitor 32 to point A in the feedback bridge circuit 11, and to a relaxation-type oscillator 33. The capacitor 32 and the resistor 16 in the bridge network comprise a differentiating circuit whereby the derivative of the D.-C. control voltage at the discriminator output appears across the resistor 16. The resulting derivative feedback serves to dampen the action of the direct current feedback loop preventing oscillation thereof.

The frequency of oscillation of the relaxation oscillator 33 is controlled by the level of the direct current control voltage supplied thereto by the discriminator 27. In the circuit illustrated, the oscillator components are selected, and adjusted, to provide a sawtooth waveform having a frequency of 40 cycles per second when ΔE, at the converter 18 input, is zero. When ΔE goes positive, the frequency of oscillation decreases, and when ΔE goes negative the frequency thereof increases; the amount of the frequency change depending directly upon the magnitude of ΔE, and varying generally between 20 to 60 cycles per second.

The sawtooth wave output from the relaxation oscillator is coupled to a bistable, flip-flop, multivibrator 34 for actuation thereof. The multivibrator produces a frequency division of two whereby the output therefrom is a 10 to 30 cycle per second square wave. The square wave output from the multivibrator 34 is connected through lead wire 36 to a push-pull amplifier 37 where the square wave is amplified. The amplifier output is fed to a saturable reactor 38. The core of the saturable reactor is made of sensitive magnetic material which saturates easily, whereby each cycle of the amplified square wave from the push-pull amplifier 37 drives the core well into saturation, first in one direction and then in the other. The saturable reactor output, therefore, comprises pulses of alternate opposite polarity, which pulses are of a predetermined fixed width and magnitude. The pulse repetition rate, of course, is a direct function of the frequency of the square wave input to the saturable reactor. The pulses from the saturable reactor are rectified by the rectifier 39 and the output therefrom fed through a variable resistor 41 and the resistor 16 in the bridge network 11. A large filter capacitor 42 is connected across the resistor 16 in order to smooth the rectifier output. It will be understood that the direct current voltage developed across resistor 16, and designated $E_o$, is directly proportional to the pulse frequency. Also, as mentioned above, the derivative feedback signal which is derived from the output of the discriminator 27 is also applied to the resistor 16 through the capacitor 32, and helps prevent oscillation of the feedback loop.

The 10 to 30 cycle per second output from the multivibrator 34 comprises the useful signal output, the frequency of the square wave therefrom varying directly with the direct current input, $E_{in}$. It is possible to utilize the 10–30 cycle per second output directly, for telemetering purposes, if desired, by transformers coupling the same to a line, or driving a relay for keying a power line carrier, for example. In the drawings, however, we show the square wave output coupled through an isolation amplifier 43 to a carrier frequency transmitter 44. The carrier frequency transmitter 44 includes a diode keying, or clamping circuit 46 connected to a carrier oscillator 47. The output from the clamping diode produces a change of frequency of the carrier oscillator, which oscillator operates in the audio frequency range. The frequency of the oscillator is normally varied less than 10%. This frequency modulated signal is amplified by an amplifier 48 and coupled to the communication circuit 49 through a band pass filter 51.

Reference is now made to Figure 2 of the drawings wherein a schematic circuit diagram of the telemeter transmitter is shown. The bridge network 11 is the same as that shown in Figure 1 and described above. The terminals B—C of the bridge network 11 are connected through a filter network comprising a pair of series connected resistors 56 and 57 and a shunt filter capacitor 58, to the input to the converter 18. The converter 18 is of the conventional vibrator type, as mentioned above, and includes a movable contact 59 which is actuated in opposite directions to alternately make and break electrical contact with a pair of spaced fixed contacts 61, 61. Vibration of the movable contact is obtained by use of the alternating potential 19 which energizes the vibrator coil 62. The fixed contacts 61 of the vibrator are connected to the primary winding 63 of a transformer 64. The one input lead to the vibrator is connected to the movable contact 59 while the other is connected to a center tap of the transformer primary winding. Thus, the vibrator opens and closes the input circuit thereto at the frequency of the alternating current source 19, which is preferably a 60 cycle per second source. The input potential ΔE is thereby converted to a pulsating potential at the transformer secondary winding 66. A capacitor 67 is connected across the transformer secondary winding 66 for the purpose of suppressing harmonic frequency potentials thereat.

One end of the parallel connected transformer secondary winding and capacitor 67 is connected to the common ground 20, while the other end thereof is connected through a lead wire 68 to the control grid 69 of a first amplifier tube 71. The first amplifier is of a conventional design, the tube 71 being a pentode with a cathode 72, screen grid 73, suppressor grid 74 and anode 76. The cathode is connected to ground through an unbypassed cathode resistor 77 and to the 150 volt source of positive potential through a voltage divider resistor 78 and a decoupling resistor 79. The suppressor grid 74 is connected directly to the cathode, as is usual. The anode and screen grids are connected to the same 150 volt source of potential through anode and screen grid resistors 81 and 82, respectively, and the series decoupling resistor 79. A screen by-pass capacitor 83 is connected between the screen grid and ground potential. The anode of the first amplifier tube 71 is connected through the usual coupling capacitor 84 and a potentiometer 86 to ground; a portion of the potential developed across the potentiometer resistance, as determined by the position of the movable arm thereof, being coupled to the grid 87 of the second amplifier tube 88. The second amplifier tube is connected in substantially the same manner as the first, except no connection is made for the cathode thereof to the positive 150 volt potential source.

The anode of the second amplifier tube 88, which is designated 89, is connected through a coupling capacitor 91 to one control grid 92 of a discriminator tube 93. A second control grid 94 of the tube 93 is connected through a grid current limiting resistor 96 to the alternating current source 19, which also actuates the vibrator type converter 18 as described above. It will be understood that the discriminator tube 93 is of the gated beam type, such as a 6BN6, which has a high transconductance between each control grid and the anode 97; the anode being connected through a load resistor 98 to the 150 volt source of potential. The cathode 99 of the gated beam type discriminator tube is connected through a cathode bias resistor 101 and cathode bias potentiometer 102 to ground potential. The screen 103 of the tube is connected through a series screen resistor 104 to the 150 volt positive potential source. Because of the high transconductance between each control grid and the anode, both control grids exercise a high degree of control over the flow of the electron stream through the tube. Each grid can produce wide variations in plate current with only a relatively low applied grid signal. Minimum plate current flows in the discriminator tube when the grid voltages on the two control grids 92 and 94 are out of phase, and maximum current flows when the two control grid voltages are in phase. Intermediate values of plate current depend upon the magnitude of the 60 cycle output of the second amplifier on the first control grid 92 of the discriminator. The discriminator tube is biased, by the adjustment of the cathode biasing potentiometer 102, in the mid-operating range of the anode potential with no signal on the first control grid 92. Plate potential excursions from this no-signal setting are directly related to the magnitude of the potential ΔE applied to the converter 18, while the direction of the plate potential excursion, that is, above or below the no-signal setting, is dependent upon the polarity of the potential ΔE. In other words, the anode potential of the anode 97 of the discriminator tube is directly related to the value of the potential ΔE, considering also the polarity thereof.

A triode tube 106, which is connected as a diode, and having a cathode 107 which is connected directly to ground potential, and an anode 108 and grid 109 which are connected to the positive 150 volt potential source through a resistor 111, is used to compensate for variations of the plate current of the discriminator tube 93 with changes in filament temperatures of the discriminator tube (the tube filaments not being shown in the drawings). The anode and grid 108 and 109 of the tube 106 are connected through a grid current limiting resistor 112 to the grid 92 of the discriminator tube 93. It will be understood, then, that the voltage drop across the tube 106 changes with changes in filament voltage and operates on the one control grid 92 of the discriminator tube 93 to counteract the changes of plate current thereof due to like changes in its filament voltage.

The output from the discriminator tube 93, which varies directly with the potential ΔE to the vibrator type converter 18, is connected through a large resistor 113 to the screen grid 114 of a tube 116 which is included in the relaxation oscillator circuit designated 33 in Figure 1. Filter capacitors 117 and 118 are connected from opposite sides of the resistor 113 to ground potential. The resistor 113, together with the capacitor 118, form a large time constant network which is necessary to stabilize the feedback loop and prevent it from oscillating. Further necessary stabilization of the feedback loop is provided by a novel derivative feedback circuitry which includes a series connected resistor 119, capacitor 121 and the resistor 16 in the bridge network 11. The above mentioned resistors and capacitor are connected between the grid 114 of the tube 116 and ground potential. The filter capacitor 42 is connected in parallel across the bridge resistor 16. The resistors 119 and 16, and the capacitor 121 comprise a differentiating circuit whereby the derivative of the signal voltage, which is applied to the grid 114 of the relaxation oscillator tube, is fed back to the bridge input resistor 16. The derivative feedback so provided serves to dampen the action of the feedback loop for sudden changes in the analog input voltage $E_{in}$.

It will here be noted that for certain ranges of input voltage $E_{in}$, improved damping action may be obtained by the removal of the resistor 119, and by connecting the capacitor 121 directly to the anode 97 of the discriminator tube 93 rather than to the resistor 119 as shown. (The two connection points are designated E and F on the schematic circuit diagram.) In any event, it will be understood that for proper operation of the circuit, the direct current discriminator output signal is fed back to the input bridge through a differentiating circuit in order to dampen the direct current feedback loop for sudden changes in input voltage $E_{in}$.

Continuing, now, the description of our novel telemeter transmitter circuitry, the tube 116 includes a control grid 126 which is connected directly to ground potential. The cathode 127 and suppressor grid 128 of the tube are connected to the movable arm of a frequency adjusting potentiometer 129. The potentiometer resistance is connected between voltage divider resistors 131 and 132; the other side of the resistor 131 being connected to the positive potential source of 150 volts and the resistor 132 to ground potential. The anode 133 of the tube 116 is connected through a parallel connected gas discharge tube 134 and capacitor 136 to the 150 volt potential source. The gas discharge tube may be a neon tube, or any other suitable type.

The tube 116 functions as a variable resistance which is in series with the shunt connected gas tube 134 and capacitor 136; the series-parallel combination being connected across a 150 volt source of potential. The resistance of the tube 116 is determined, primarily, by the setting of the potentiometer 129, which setting controls the cathode potential, and by the magnitude of the direct current control voltage from the discriminator applied to the screen grid of the tube 116.

When the 150 volt voltage source is applied to the oscillator circuit, the voltage across the capacitor 136 is zero. The capacitor voltage rises exponentially at a rate depending upon the RC time constant wherein R is the resistance from ground to the anode 133 of the tube 116, and C is the value of the capacitor 136. When the capacitor voltage reaches a sufficient level, the gas tube ionizes and provides a discharge path for the capacitor 136. The potentiometer 129 is adjusted to provide an oscillator frequency of 40 cycles per second when the anode potential of the discriminator tube 93 is at its mid operating point. In operation, the frequency of oscillation is controlled by the direct current screen voltage as supplied by the plate of the discriminator tube 93. An increase in screen grid voltage serves to increase the frequency of oscillation, while a decrease in voltage decreases the oscillator frequency. The circuit components of the oscillator are selected for a frequency range of 20 to 60 cycles per second.

The resulting sawtooth wave output from the relaxation oscillator is coupled through a coupling capacitor 138 and lead wire 139 to the bistable multivibrator, designated 34 in Figure 1. The bistable multivibrator has two stable limiting conditions into which the circuit is alternatively triggered by the sawtooth wave output from the relaxation oscillator. The multivibrator is of conventional design comprising a pair of triode tubes 141 and 142 in which the grid 143 of the tube 141 is coupled to the anode 144 of the tube 142 through a network consisting of a parallel connected resistor and capacitor, 147 and 148, respectively. The grid 149 of the tube 142 is similarly coupled to the anode 151 of the tube 141 through an identical network comprising the parallel connected resistor and capacitor 147' and 148', respectively. The cathodes 152 and 153 of the tubes 141 and 142, respectively, are connected together and through a cathode resistor 154 to ground potential. The anodes 151 and 144 are connected through plate load resistors 156 and 157, respectively, to a 150 volt source of potential. The grids 143 and 149 are connected through grid leak resistors 158 and 159, respectively, to the common ground connection 20. The circuit is bistable; one condition exists when the tube 141 is conducting and the tube 142 is cut off, and another condition exists when the tube 142 is conducting and the tube 141 is cut off. The circuit remains in one or the other of these two conditions with no change in the anode, grid, or cathode potentials, or anode current, until triggered by a sawtooth waveform from the relaxation oscillator; the sawtooth output being coupled through the capacitor 138 and lead wire 139 to the cathodes 152 and 153 of the multivibrator circuit. The multivibrator switches from one stable condition to the other with each sawtooth wave input. In this way, the multivibrator functions to divide the frequency of oscillation of the relaxation oscillator by two and thereby delivering a 10 to 30 cycle per second square wave output voltage to the push-pull amplifier designated 37 in Figure 1.

The multivibrator outputs, for the push-pull amplifier, are obtained from the anodes 151 and 144 thereof, and coupled through the usual coupling capacitors and grid leak resistors, to the grids 161 and 162 of the amplifier tubes 163 and 164, respectively. The push-pull amplifier is of conventional design, with the anodes 166 and 167 thereof being connected to the ends of a centertapped primary winding 168 of the saturable reactor 38, the center tap of the primary winding is connected to the 150 volt source of potential through a connection 169. The secondary winding 171 of the saturable reactor is provided with a grounded center tap 172. The core of the saturable reactor is made of sensitive magnetic material which saturates easily with relatively few ampere-turns. Therefore, the number of coulombs, per pulse, which are delivered from the secondary winding 171 to the rectifier network 39 is a fixed and stable quantity. The rectifier network 39, which includes a pair of rectifier elements 173 and 174, receive the saturable reactor output pulses, which pulses vary in frequency according to the input ΔE to the converter 18. The rectified pulses are fed through the variable resistor 41 to the resistor 16 in the input bridge 11. A voltage is thus developed across the resistor 16 which is proportional to the frequency of the pulses. The capacitor 42, as mentioned above, serves to filter the pulsating current from the rectifier network.

The 10 to 30 cycle per second output frequency from the multivibrator is also connected by a coupling capacitor 178 and grid leak resistor 179 to the control grid 181 of a tube 182 of the isolation amplifier 43. The amplifier output is coupled through a capacitor 183 to one of the diode keying tubes 184 in the diode keying circuit 46. Negative pulses from the isolation amplifier tube 182 ground a capacitor 186 through the second diode keying tube 187, changing the frequency of the tuned circuit of the carrier oscillator 47, which includes the triode tube 188. The oscillator frequency is in the audio range and the frequency thereof is normally varied less than ±10 percent. The frequency modulated signal from the oscillator is amplified by the amplifier tube 191 and coupled through the band pass filter 51 to the communication circuit terminals 49. The carrier frequency transmitter which is of conventional design, forms no part of our invention.

The operation of our novel telemeter transmitter is believed apparent from the above description. Briefly, however, it will be noted that the analog, or direct current millivolt quantity, $E_{in}$, is injected into the bridge 11 of the feedback loop between terminals A and B. The base millivolt source, designated $E_b$, and also the output voltage of the feedback network, $E_o$, are included in the bridge network. The voltage $E_o$ is supplied by the derivative feedback network from the discriminator 27 output, and by the rectified output of the saturable reactor 38. It will be apparent, however, that the capacitor 32 in the derivative feedback circuit from the discriminator 27 cannot carry direct current components in continuing time. The voltage $E_o$ may, therefore, in time, be considered as being derived entirely from the rectified saturable reactor output. The amplitude of the voltage, $E_o$, delivered by the rectifier circuit 39 is directly proportional to the frequency of the driving voltage applied to the saturable reactor 38. The base millivolt source, $E_b$, is necessary since the low scale end of the input voltage, $E_{in}$, always requires an output frequency of 10 cycles per second and a corresponding output, $E_o$, from the saturable reactor. The fourth bridge voltage ΔE, between terminals B and C thereof, is applied to the converter input which, in turn, controls the relaxation oscillator frequency, and thus, the frequency of the driving voltage for the saturable reactor. The voltage balance equation for the bridge network 11 is such that:

$$E_b + (\pm \Delta E) + E_{in} = E_o \quad (1)$$

The magnitudes of $E_b$ and $E_o$ are set by adjustment of the potentiometers 13 and 41, respectively. Since ΔE controls the oscillator frequency, it is possible to adjust the converter-amplifier circuit and oscillator such that the following conditions exist in the bridge circuit for a 10 to 30 cycle per second output:

|  | $E_b$ | $(\pm \Delta E)$ | $E_{in}$ | $E_o$ |
|---|---|---|---|---|
|  | Mv. | Mv. | Mv. | Mv. |
| 10 c.p.s. | 48 | 1 | 0 | 49 |
| 20 c.p.s. | 48 | 0 | 50 | 98 |
| 30 c.p.s. | 48 | −1 | 100 | 147 |

It will be apparent that any changes occurring in the circuit after the initial adjustment, such as amplifier gain or oscillator frequency drift, will be counteracted by the change in the amplitude and polarity of the controlling voltage ΔE. Non-linearity in the amplifier and oscillator circuits is also minimized by the direct current circuit feedback action. The degree to which the feedback correction functions is determined by the gain around the feedback loop, which is $E_o/\Delta E$, and in the case above is 98 mv./2mv.=49. A gain much higher than this would cause the feedback loop to oscillate. Further stabilization of the circuit is obtained by the derivative feedback from the discriminator output, which is applied to the bridge resistor 16.

It will be apparent that the bridge component values may be changed to change the values of $E_b$ and $E_o$ for various ranges of input voltage $E_{in}$. In all cases, the circuits are adjusted for an output frequency of 20 cycles per second when ΔE is at zero.

Having now described our invention in detail in accordance with the patent statutes, various changes and modifications will suggest themselves to those skilled in this art, and it is intended that such changes and modifications shall fall within the spirit and scope of the invention as recited in the following claims.

We claim:

1. Apparatus for converting an analog input into an output voltage the frequency of which varies directly with the magnitude of the analog input, the said apparatus comprising a converter having an input and output circuit, the said analog input being connected to the said converter input circuit, discriminator means connected to the said converter output circuit and converting the output therefrom to a direct current control voltage proportional to the amplitude of the converter output, means changing the direct current control voltage output from the discriminator to an alternating output voltage the frequency of which varies directly with the magnitude of the control voltage, means changing the said alternating output voltage to a direct current feedback potential directly proportional to the frequency thereof, and means connecting the said direct current feedback potential to the said converter input circuit, the said converter being responsive to the algebraic sum of the said analog input and feedback potential.

2. The invention as recited in claim 1 including a differentiating circuit, and means connecting the said control voltage to the converter input circuit through the said differentiating circuit, the resultant derivative feedback serving to damp the action of the feedback loop which includes the said means changing the said alternating output voltage to a direct current feedback potential, for sudden changes in the said analog input.

3. The invention as recited in claim 1 wherein the said means converting the direct current control voltage to an alternating output voltage comprises a sawtooth wave oscillator the frequency of which varies directly with the magnitude of the said control voltage, and a multivibrator responsive to the said sawtooth wave oscillator output.

4. Apparatus for converting an analog input into an output voltage the frequency of which varies directly with the magnitude of the analog input, the said apparatus comprising a converter having an input and output circuit, means connecting the said analog input to the said converter input circuit, a first discriminator coupled to the said converter output circuit and responsive to the output therefrom, a relaxation oscillator coupled to the said first discriminator, the frequency of oscillation of the relaxation oscillator being controlled by the first discriminator output, a multivibrator coupled to the said relaxation oscillator, the pulse frequency output of the multivibrator being controlled by the frequency of oscillation of the said relaxation oscillator, a second discriminator coupled to the said multivibrator and responsive to the multivibrator output, the said second discriminator output being directly proportional to the pulse frequency output of the multivibrator, and means connecting the second discriminator output to the said converter input circuit, the said converter being responsive to the algebraic sum of the said second discriminator output and analog input.

5. The invention as recited in claim 4 wherein the said second discriminator comprises a saturable reactor and rectifier, the said saturable reactor being responsive to the multivibrator pulse frequency output and the rectifier being responsive to the saturable reactor output.

6. The invention as recited in claim 4 including a differentiating circuit, and means connecting the output from the said first discriminator to the said converter input through the said differentiating circuit, the resultant derivative feedback serving to damp the action of the feedback loop which includes the said second discriminator for sudden changes in the said analog input.

7. The invention as recited in claim 4 wherein the said multivibrator is bistable, the multivibrator output frequency being one-half the frequency of the relaxation oscillator output.

References Cited in the file of this patent

UNITED STATES PATENTS

| | | |
|---|---|---|
| 1,929,259 | Rich | Oct. 3, 1933 |
| 2,497,129 | Liston | Feb. 14, 1950 |
| 2,567,896 | Semm | Sept. 11, 1951 |
| 2,717,359 | Wild | Sept. 6, 1955 |
| 2,752,432 | Richter | June 26, 1956 |
| 2,806,988 | Sulpizio et al. | Sept. 17, 1957 |

OTHER REFERENCES

"Principles and Methods of Telemetering," by P. A. Borden et al., 1948, Reinhold Publishing Co. (pp. 127, 128 relied on).